United States Patent Office 2,740,346
Patented Apr. 3, 1956

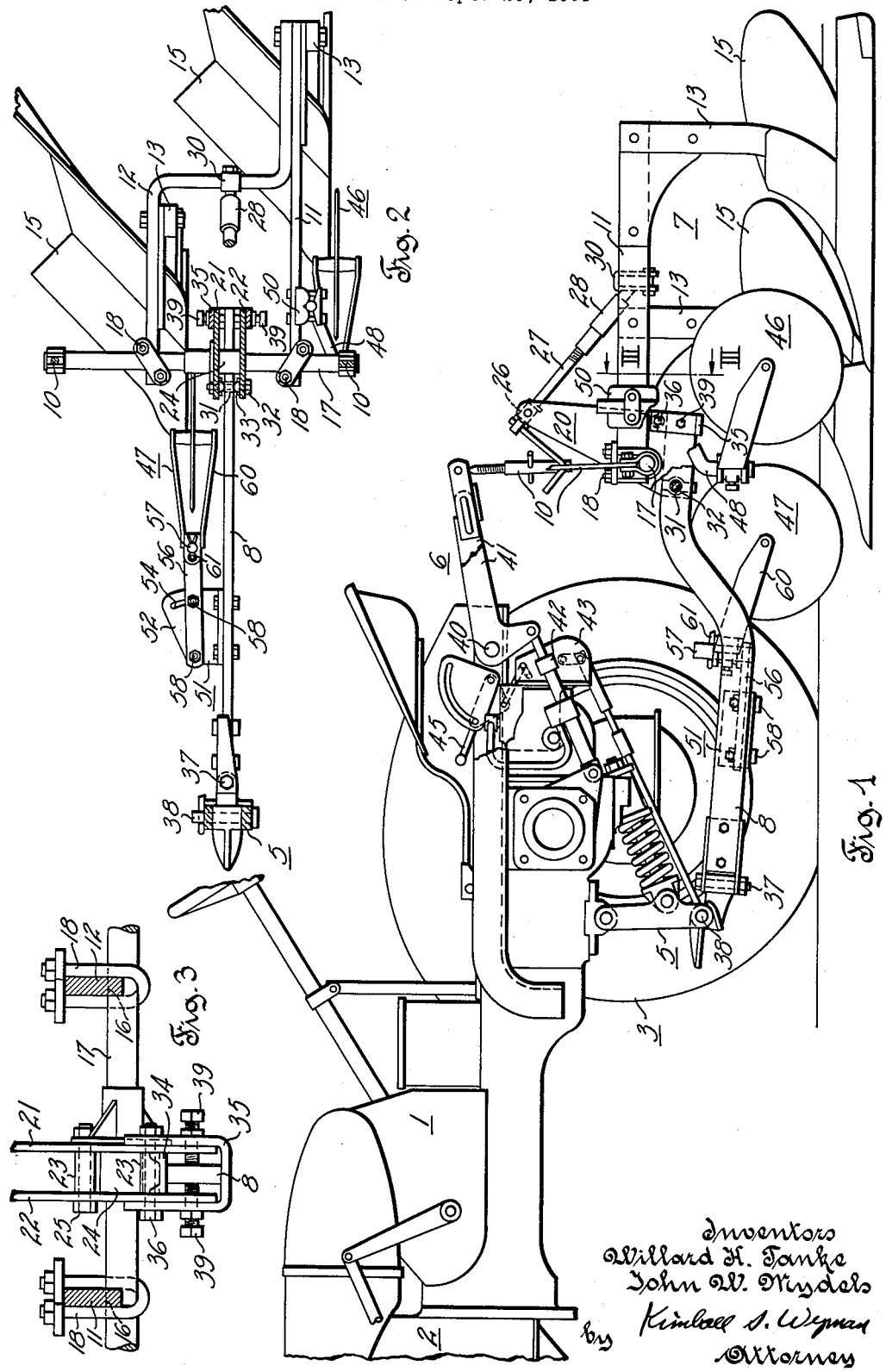

2,740,346

TRACTOR PLOW

Willard H. Tanke and John W. Mydels, La Crosse, Wis., assignors to Allis-Chalmers Manufacturing Company, Milwaukee, Wis.

Application September 25, 1951, Serial No. 248,166

3 Claims. (Cl. 97—47.63)

This invention is directed generally to agricultural implements and is more particularly concerned with an improved form of tractor mounted plow and colter combination.

The direct mounting of agricultural implements, particularly plows, at the rear of the tractor is becoming increasingly popular because of the advantages gained thereby in the way of elimination of parts necessary for a self-supporting implement, more effective utilization of tractor power, and easier handling on hillsides and in turning at the end of the field, to mention a few. Moreover, in the design of rear mounted plows much effort has been directed toward placing the implement as close to the tractor as possible in order to achieve a uniform width of cut on curves and contours and, also, shorten the turning radius of the tractor and implement. The close coupling of a plow has been somewhat hampered, however, by the need for a colter which is generally supported on the plow beam ahead of the plow. This necessarily calls for a plow beam extending forwardly of the plowshare point.

Still another factor in the design of a suitable draft coupling for a rear attached plow is that of lateral adjustment. It has been found beneficial to provide some means for varying the width of the cut of the plow and this is generally accomplished by laterally shifting the plow with respect to the center line of the tractor. Consequently, in designing a close coupled tractor rear attached plow consideration must be given to means affording lateral adjustment of the plow and, also, to a suitable means for mounting the colter for the forwardmost plow.

And it is an object of this invention to provide, in combination with a laterally adjustable plow, a colter mounting affording close coupling of the plow to the tractor wherein the colter is laterally adjustable to position same over the plow point at any adjusted lateral position of the plow.

It is also an object of the present invention to provide a colter mounting affording the positioning of the colter blade directly over the plowshare point without also extending the plow beam forward of the point.

The construction and operation of apparatus embodying the invention will become more apparent as the disclosure progresses and particularly points out additional objects and advantages of special importance. And, accordingly, the present invention may be considered as comprising the various constructions, combinations and/or subcombinations of parts as is hereinafter more fully set forth in the detailed description and appended claims, reference being had to the accompanying drawing illustrating but one embodiment of the invention, and in which:

Fig. 1 is a side view of a tractor implement combination embodying the present invention, with the near rear wheel removed in the interest of clarity;

Fig. 2 is a plan view of the plow structure shown in Fig. 1 with the upper portions of the beaming adjustment mechanism and the lift links broken away; and Fig. 3 is a partial section taken generally on line III—III of Fig. 1.

Referring particularly to Fig. 1, it is seen that apparatus embodying the present invention comprises generally a conventional wheel type tractor 1 having an engine 2 supplying power to a pair of drive wheels 3, a hitch member 5 for attaching an implement to the tractor, and having a lift means 6 disposed on the rear of the tractor, and a two bottom moldboard plow 7 having a forwardly extending draft device or pull bar 8 connected with hitch member 5 on the tractor to couple the plow in close relation to the tractor with a pair of lift links 10 affording connection between the plow and the tractor carried lift means.

More specifically, plow 7 includes a supporting frame comprising generally parallel side members or beams 11 and 12 with the latter being bent, at an intermediate portion thereof, inwardly and at right angles to the parallel beam portions to terminate in a rearwardly extending portion secured to beam 11 in side abutting relation thereto. Vertical stub members 13 are fixedly secured in depending relation to beams 11 and 12, respectively, in laterally and longitudinally spaced relation with respect to each other and each of these stub members mounts a conventional plow bottom 15.

The forward underside end portions of plow beams 11 and 12 are preferably notched at 16 to receive a transverse lift bar 17 which is detachably secured in laterally adjustable relation to the plow frame through suitable means such as U-bolts 18. The portion of lift bar 17 intermediate the plow beams mounts a rigid structure 20 comprising a pair of vertically disposed parallel plate members 21 and 22 which include aligned openings therethrough to receive the lift bar in rotatable and axially movable relation. Plates 21 and 22 are preferably maintained in spaced relation by spacer elements 23 detachably secured in position at upper and lower portions of the plates by bolts 25. Furthermore, the plates are adjustably maintained in laterally fixed position on lift bar 17 by means of a set collar 24 positioned on the lift bar between plate members 21 and 22.

The upper ends of plates 21 and 22 have detachably supported therebetween a trunnion 26 rotatably receiving a beaming crank or screw 27 which is threaded at its rearward end for engagement with an internally threaded anchor 28 pivotally secured to a yoke 30 fixed on the transverse portion of plow beam 12 in laterally adjustable relation thereto. Actuation of crank 27 effects a vertical swinging movement of the beams 11 and 12 relative to bar 17 and consequently a beaming adjustment of plow 7 is achieved.

The lower portions of plates 21 and 22 extend below lift bar 17 to afford means for attaching pull bar 8 thereto. The pull bar has a transverse opening 31 therethrough at its rearward end portion which is alignable with a pair of openings in plate members 21 and 22 and a bolt 32 is inserted through the aligned openings to pivotally secure the pull bar to the plate members. Opening 31 in pull bar 8 is preferably made somewhat larger than necessary to receive bolt 32 in order that the pull bar may be pivoted laterally, to a limited extent, as well as vertically. Spacer blocks 33, having inwardly facing convex portions with an opening therethrough, are preferably arranged on bolt 32 between pull bar 8 and each of the plate members to permit the aforementioned lateral pivotal movement of pull bar 8. The rear end portion of pull bar 8 is held against downward vertical movement relative to plates 21 and 22 by means of a yoke member 35 fixedly secured to the lower rear portions of the plates, as by bolts 36, with the bight portion of the yoke in supporting relation to bar 8. Upward movement of the pull bar is prevented by a spacer block 34 interposed between the overlying spacer element 23 and the upper edge of pull bar 8. And, it is to be noted in this respect, that the spacing of plate members 21 and 22 is greater than the width of pull bar 8 and, consequently, there is afforded the above mentioned lateral pivotal movement of the pull bar relative to the axis of bolt 32. In order to limit this lateral movement and, also, to provide means for the horizontal angular position of the pull bar relative to the plow structure, there is provided a pair of set screws 39 which are threadably received in plate members 21 and 22, respectively, and extend therethrough to engage opposite side portions of the rearmost end of the pull bar. Consequently, by axially adjusting the position of set screws 39 pull bar 8 may be laterally pivoted about bolt 32. This change in the angular position of the pull bar relative to the plow structure affects the angular relationship of the moldboards to the direction of travel and, accordingly, results in a corresponding change in the width of cut of the plow. It will be noted that in the preferred embodiment of the invention, the beams 11 and 12, stub members 13 and plow bottoms 15 form a unitary structure which is secured to the lift bar 17 independently of the pull bar 8 for lateral adjustment relative thereto along the lift bar 17.

The forward end portion of pull bar 8 is provided with suitable means for connection with hitch member 5 on the tractor. This is preferably a hitch connection affording universal movement of the pull bar with respect to the tractor, such as is afforded in the construction shown in Fig. 1 wherein bolt 37 affords horizontal pivotal movement of the pull bar and pin 38 affords vertical pivotal movement of pull bar 8 relative to the tractor.

For lifting and lowering the plow structure there is provided a lift mechanism 6 on the tractor comprising a transverse rock shaft 40 rotatably mounted on the rear of the tractor and having a pair of lift arms 41 in the form of bell cranks fixed to rock shaft 40 for rotation therewith in laterally spaced relation, a pair of rams 42 operably connected with the lift arms 41 for actuation thereof, and a hydraulic pump 43 driven from the tractor engine and controllable through a lever 45 on the tractor. Lift links 10, which are pivotally connected at one end to lift bar 17 of the plow structure, are connected with the free end portions of lift arms 41 on the tractor. And in this connection it will be noted that the right lift link includes a turnbuckle arrangement which affords vertical movement of the associated end of lift bar 17 relative to the opposite end of the bar to thereby adjust the winging or lateral tilt of the plow.

A pair of colters 46 and 47 are operatively positioned on the plow structure in adjacent overlying relation to the points of the plow bottoms 15. Colter 46 for the left hand plow includes a rotary disk or colter element and a vertical shank portion 48 adjustably secured in position on the forward end of plow beam 11 by a suitable clamping bracket 50. Colter 47 likewise includes a rotary disk and shank portion and is operatively mounted on the right side portion of pull bar 8 for adjustment laterally with respect thereto to conform with the positioning of the right hand plow bottom 15. More specifically, an angle bracket 51 is bolted to the side of the pull bar with the horizontally disposed leg 52 thereof extending laterally outward in the direction of the forwardmost plow bottom and presents a pair of longitudinally spaced bolt receiving openings to receive bolts 58, the rearwardly located opening 54 being in the form of an arcuate slot. A strap member or swivel support 56, having a vertically disposed swivel or shank portion 57 secured thereto, is positioned in surface abutting relation to leg 52 and secured thereto by bolts 58. Colter 47 includes a yoke 60 which has a vertically disposed opening therethrough to receive shank 57 and thereby afford a pivotal mounting for the colter. Suitable means, such as pin 61, is provided to detachably secure yoke 60 in vertically fixed relation to shank portion 57.

Features of the hitch means and of the pull bar and frame adjustments herein shown and described, but not claimed, have been made the basis of separate copending application now U. S. Patent 2,650,529, filed October 1, 1951, by W. H. Tanke for Tractor Plow Affording Adjustable Width of Cut, and copending application now U. S. Patent 2,732,784, filed November 1, 1951, by W. H. Tanke and R. S. Reaves for Plow Hitch.

It is seen from the foregoing description that the arcuate slot 54 provides a ready means for laterally adjusting the position of colter 47, through the loosening of bolts 58 and movement of strap 56 about the pivot axis of the forwardly disposed bolt, in order that the colter may be properly positioned with respect to its related plow bottom. Furthermore, the disposition of the colter attaching bracket 51 on draft bar 8 eliminates the need for an extension of plow beam 12 to afford a mounting for the colter. This is a very important factor in the design of a plow structure for mounting in close coupled relation to the rear of the tractor.

Although the present invention has been shown and described with respect to its adaptability to a particular structure, it should be understood that it is not intended to thereby limit the invention. Various modifications and adaptations within the scope of the appended claims may readily occur to persons skilled in the art.

It is claimed and desired to secure by Letters Patent:

1. In a rear attached tractor carried plow, the combination of a transverse lift bar presenting opposite ends adapted for connection with a pair of laterally spaced tractor carried lift arms, a forwardly extending generally rigid pull bar operatively connected at its rearwardly disposed end portion to said lift bar, a plow beam extending transversely of said lift bar; means securing said plow beam independently of said pull bar to said lift bar for lateral adjustment therealong, a plow bottom carried by said beam, a colter element, and means positioning said colter element in forwardly spaced operative relation to said plow bottom, said positioning means including a support mounted on and adjustable laterally relative to said pull bar in advance of said plow bottom, releasable locking means operatively interposed between said support and said pull bar for securing said support selectively in different laterally adjusted positions relatively to said pull bar, and means operatively mounting said colter element on said support.

2. In a rear attached tractor carried plow, the combination of, a transverse lift bar adapted for connection with a pair of tractor carried lift arms, a pull bar operatively connected to said lift bar so as to extend forwardly therefrom in horizontally, vertically and angularly fixed relation thereto, a hitch element at a forward portion of said pull bar adapted for establishing a vertically swingable draft transmitting connection between the latter and a tractor mounted hitch member, a plow frame comprising a pair of beams extending transversely of said lift bar in laterally spaced relation to each other, releasable fastening means connecting said beams at forward end portions thereof in fixed, axially adjustable relation to said lift bar, a first plow bottom carried by one of said beams and having its point disposed forwardly of said lift bar, a second plow bottom carried by the other of said beams and having its point disposed rearwardly of said lift bar, a first colter element mounted on said pull bar for selective adjustment laterally thereof into operative position relative to the point of said first plow bottom, and a second colter element operatively mounted on said other of said beams forwardly of the point of said second plow bottom.

3. In a rear attached tractor carried plow, the combination of, a transverse lift bar adapted for connection with a pair of tractor carried lift arms, a pull bar operatively connected to said lift bar and extending forwardly therefrom, a hitch element at a forward portion of said pull bar adapted for establishing a vertically swingable draft transmitting connection between the latter and a tractor mounted hitch member, a plow frame comprising a pair of beams extending transversely of said lift bar in laterally spaced relation to each other, releasable fastening means connecting said beams at forward end portions thereof in fixed axially adjustable relation to said lift bar, a first plow bottom carried by one of said beams and having its point disposed forwardly of said lift bar, a second plow bottom carried by the other of said beams and having its point disposed rearwardly of said lift bar, a swivel support mounted on and adjustable laterally relative to said pull bar at the side of the latter nearest said one plow beam in advance of said first plow bottom, releasable locking means operatively interposed between said swivel support and said pull bar for securing said swivel support selectively in different laterally adjusted positions relative to said pull bar, a yoke member pivotally mounted on said swivel support for lateral swinging movement relative to said pull bar, a first colter disk operatively mounted on said yoke member forwardly of the point of said first plow bottom, a second colter disk, and means operatively mounting said second colter disk on said other of said beams forwardly of said second plow bottom.

References Cited in the file of this patent

UNITED STATES PATENTS

| | | |
|---|---|---|
| 360,034 | Meikle | Mar. 29, 1887 |
| 1,683,017 | Bechtelheimer et al. | Sept. 4, 1928 |
| 2,030,567 | Bowen | Feb. 11, 1936 |
| 2,420,530 | Evans | May 13, 1947 |
| 2,483,565 | Strandlund | Oct. 4, 1949 |
| 2,619,019 | Temple et al. | Nov. 25, 1952 |
| 2,650,529 | Tanke | Sept. 1, 1953 |
| 2,685,241 | Silver et al. | Aug. 3, 1954 |
| 2,688,908 | Reaves et al. | Sept. 14, 1954 |